(12) United States Patent
Chen et al.

(10) Patent No.: US 11,323,221 B2
(45) Date of Patent: May 3, 2022

(54) METHOD FOR RECEIVING REFERENCE SIGNAL AND METHOD FOR SENDING REFERENCE SIGNAL

(71) Applicant: HUAWEI TECHNOLOGIES CO., LTD., Shenzhen (CN)

(72) Inventors: Zheng Chen, Beijing (CN); Jianguo Wang, Beijing (CN); Xu Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 16/876,087

(22) Filed: May 17, 2020

(65) Prior Publication Data

US 2020/0280415 A1 Sep. 3, 2020

Related U.S. Application Data

(63) Continuation of application No. PCT/CN2018/115819, filed on Nov. 16, 2018.

(30) Foreign Application Priority Data

Nov. 17, 2017 (CN) .......................... 201711147779.X

(51) Int. Cl.
*H04W 72/04* (2009.01)
*H04L 5/00* (2006.01)
*H04L 25/02* (2006.01)

(52) U.S. Cl.
CPC .......... *H04L 5/0048* (2013.01); *H04L 5/0007* (2013.01); *H04L 25/0224* (2013.01); *H04W 72/042* (2013.01)

(58) Field of Classification Search
CPC ... H04L 5/0048; H04L 5/0007; H04L 5/0053; H04L 5/0035; H04L 27/2613;
(Continued)

(56) References Cited

U.S. PATENT DOCUMENTS

2009/0175159 A1 7/2009 Bertrand et al.
2015/0085793 A1 3/2015 Luo et al.
(Continued)

FOREIGN PATENT DOCUMENTS

CN 101394263 A 3/2009
CN 103973392 A 8/2014
(Continued)

OTHER PUBLICATIONS

Intel Corporation, "[NRAH2-05] Email discussion on DMRS Sequence for NR PBCH",3GPP TSG RAN WG1 #90 Meeting R1-1712265,Prague, Czech Republic Aug. 21-25, 2017,total 25 pages.
(Continued)

*Primary Examiner* — Eva Y Puente
(74) *Attorney, Agent, or Firm* — Hauptman Ham, LLP

(57) ABSTRACT

Various embodiments provide a method for receiving reference signal and a method for sending a reference signal. In those embodiments, a terminal device can determine a location of a resource element to which a reference signal is mapped. The terminal device can determine a reference signal sequence corresponding to the resource element. The index of each element in the reference signal sequence is determined based on a resource block index of a resource block corresponding to the resource element, a quantity of resource elements that carry the reference signal in the resource block, a resource block offset, or an inter-symbol offset. The terminal device can receive the reference signal by using the resource element, and performing channel estimation or channel sounding based on the received reference signal and the reference signal sequence. Therefore, the terminal device can complete channel estimation without learning of a system bandwidth.

20 Claims, 8 Drawing Sheets

(58) Field of Classification Search
CPC ... H04L 5/0023; H04L 5/0051; H04L 5/0091; H04L 1/0026; H04L 5/0073; H04L 5/0094; H04W 72/042; H04W 74/004; H04W 72/0406; H04W 52/10; H04W 52/146; H04W 52/245; H04W 52/322; H04W 72/0413; H04W 76/11; H04W 24/08; H04W 28/18; H04W 52/40; H04J 13/0048; H04J 13/18
USPC .......................................................... 370/330
See application file for complete search history.

(56) References Cited

U.S. PATENT DOCUMENTS

| | | | | |
|---|---|---|---|---|
| 2018/0062711 | A1* | 3/2018 | Mizusawa | H04W 72/042 |
| 2018/0131488 | A1* | 5/2018 | Noh | H04L 25/0224 |
| 2018/0323849 | A1 | 11/2018 | Park et al. | |
| 2019/0268185 | A1 | 8/2019 | Wang et al. | |
| 2019/0268208 | A1* | 8/2019 | Seo | H04W 72/0406 |
| 2019/0349164 | A1* | 11/2019 | Ge | H04W 72/0453 |

FOREIGN PATENT DOCUMENTS

| | | |
|---|---|---|
| CN | 105556887 A | 5/2016 |
| CN | 106656432 A | 5/2017 |
| CN | 108111282 A | 6/2018 |
| CN | 108260219 A | 7/2018 |
| CN | 108352957 A | 7/2018 |
| WO | 2015042248 A1 | 3/2015 |
| WO | 2017171742 A1 | 10/2017 |

OTHER PUBLICATIONS

Huawei, HiSilicon, "Coexistence of different UE types on a wideband carrier",3GPP TSG RAN WG1 Meeting #90, R1-1713733,Prague, Czech Republic, Aug. 21-25, 2017, total 6 pages.

* cited by examiner

METHOD FOR RECEIVING REFERENCE SIGNAL AND METHOD FOR SENDING REFERENCE SIGNAL

CROSS-REFERENCE TO RELATED DISCLOSURES

This disclosure is a continuation of International Disclosure No. PCT/CN2018/115819, filed on Nov. 16, 2018, which claims priority to Chinese Patent Disclosure No. 201711147779.X, filed on Nov. 17, 2017. The disclosures of the aforementioned disclosures are hereby incorporated by reference in their entireties.

TECHNICAL FIELD

This disclosure relates to the communications field, and more specifically, to a method for receiving a reference signal, a method for sending a reference signal, and a communications apparatus.

BACKGROUND

Currently, in a known communications technology, a terminal device may obtain a system bandwidth, and further determine, based on the system bandwidth, a reference signal sequence corresponding to a resource element (Resource Element, RE), to perform channel estimation or channel sounding based on the reference signal sequence and a reference signal carried on the resource element.

However, in the technology, the terminal device needs to learn of the system bandwidth, and in an NR technology, the terminal device cannot learn of a system bandwidth message.

Therefore, it is desirable to provide a technology in which the terminal device can complete channel estimation or channel sounding without learning of the system bandwidth.

SUMMARY

This disclosure provides a communication method and a communications apparatus, to enable a terminal device to complete channel estimation or channel sounding without learning of a system bandwidth.

According to a first aspect, a method for receiving a reference signal is provided. The method includes: determining, by a terminal device, a location of a resource element to which a reference signal is mapped; determining, by the terminal device, a reference signal sequence corresponding to the resource element, where an index of each element in the reference signal sequence is determined based on a resource block index of a resource block corresponding to the resource element, a quantity of resource elements that carry the reference signal in the resource block, a resource block offset, and/or an inter-symbol offset; and receiving, by the terminal device, the reference signal by using the resource element, and performing channel estimation or channel sounding based on the received reference signal and the reference signal sequence.

The reference signal is generated based on the reference sequence.

Therefore, the terminal device can perform channel estimation or channel sounding without needing to learn of a size of a system bandwidth. A network device does not need to notify the terminal device of the size of the system bandwidth, so that a flexible change of a carrier bandwidth can be supported, a use method for a spectrum can be adjusted, and overheads of signaling used for indicating the system bandwidth can be reduced.

In some embodiments, the resource block index is an index of the resource block in a bandwidth part (BWP, Bandwidth Part) to which the resource block belongs.

In some embodiments, the resource block offset may also be referred to as an offset of the BWP.

In some embodiments, the resource block offset is an offset that is of a start location of the BWP in which the resource element is located and that is relative to a reference point.

The BWP in which the resource element is located may be a BWP allocated to the terminal device by the network device.

In some embodiments, the reference point is determined based on a location of a common resource block Common RB of a carrier.

In some embodiments, the reference point includes a start location of the common resource block.

In some embodiments, the reference point is determined based on a location of a synchronization signal block.

In some embodiments, the inter-symbol offset is an offset between indexes of the reference sequence unit that is carried on any two resource elements adjacent in time domain on a same subcarrier.

In some embodiments, the determining, by the terminal device, a reference signal sequence corresponding to the resource element includes: determining, by the terminal device, that an index of a reference signal sequence r(m) corresponding to a location (k, l) of the resource element is:

$$m = K \cdot (n_{PRB} + n_{offset}) + K \cdot l \cdot \Delta + m', m' = 0, \ldots, K-1.$$

k is a subcarrier index corresponding to the resource element, l is a time domain symbol index corresponding to the resource element, m is an index of the reference signal sequence, $n_{PRB}$ is the resource block index, K represents the quantity of resource elements that carry the reference signal in the resource block, $n_{offset}$ is the resource block offset, and $\Delta$ is the inter-symbol offset.

In some embodiments, the subcarrier index of the resource element and the resource block index are defined relative to the bandwidth part BWP in which the resource element is located.

In other words, the subcarrier index of the resource element and the resource block index are determined based on the BWP in which the resource element is located.

In some embodiments, the time domain symbol index corresponding to the resource element is defined relative to a start symbol of a slot in which the resource element is located.

In other words, the time domain symbol index corresponding to the resource element is determined based on the start symbol of the slot in which the resource element is located.

In some embodiments, a value of the inter-symbol offset $\Delta$ is determined based on a subcarrier spacing corresponding to the resource block.

In some embodiments, the value of $\Delta$ is greater than or equal to a bandwidth of the BWP in which the resource element is located.

In some embodiments, the value of the inter-symbol offset is greater than or equal to N*M, where N is a ratio of a maximum subcarrier spacing used for the carrier to a minimum subcarrier spacing used for the carrier, and M is greater than or equal to the bandwidth of the BWP in which the resource element is located.

In some embodiments, the value of the inter-symbol offset is greater than or equal to L*M, where L is a maximum quantity of BWPs that can be configured for the carrier, and M is greater than or equal to the bandwidth of the BWP in which the resource element is located.

In some embodiments, the resource block offset is an offset between a minimum RB index of the BWP in which the resource element is located and a minimum carrier RB index.

In some embodiments, the resource block offset is notified by using higher layer signaling.

In some embodiments, the resource block offset is a value that is of a frequency domain location of the BWP in which the resource element is located and that is configured by using higher layer signaling.

In some embodiments, the BWP in which the resource element is located is an initial BWP, and a value of the resource block offset is 0.

According to a second aspect, a method for receiving a reference signal is provided. The method includes: determining, by a network device, a location of a resource element to which a reference signal is mapped; determining, by the network device, a reference signal sequence corresponding to the resource element, where an index of each element in the reference signal sequence is determined based on a resource block index of a resource block corresponding to the resource element, a quantity of resource elements that carry the reference signal in the resource block, a resource block offset, and/or an inter-symbol offset; and sending, by the network device, the reference signal by using the resource element.

The reference signal is generated based on the reference sequence.

Therefore, a terminal device can perform channel estimation or channel sounding without needing to learn of a size of a system bandwidth. The network device does not need to notify the terminal device of the size of the system bandwidth, so that a flexible change of a carrier bandwidth can be supported, a use method for a spectrum can be adjusted, and overheads of signaling used for indicating the system bandwidth can be reduced.

In some embodiments, the resource block index is an index of the resource block in a bandwidth part (BWP, Bandwidth Part) to which the resource block belongs.

In some embodiments, the resource block offset may also be referred to as an offset of the BWP.

In some embodiments, the resource block offset is an offset that is of a start location of the BWP in which the resource element is located and that is relative to a reference point.

The BWP in which the resource element is located may be a BWP allocated to the network device by the network device.

In some embodiments, the reference point is determined based on a location of a common resource block Common RB of a carrier.

In some embodiments, the reference point includes a start location of the common resource block.

In some embodiments, the reference point is determined based on a location of a synchronization signal block.

In some embodiments, the inter-symbol offset is an offset between indexes of the reference sequence unit that is carried on any two resource elements adjacent in time domain on a same subcarrier.

In some embodiments, the determining, by the network device, a reference signal sequence corresponding to the resource element includes: determining, by the network device, that an index of a reference signal sequence r(m) corresponding to a location (k, l) of the resource element is:

$$m = K \cdot (n_{PRB} + n_{offset}) + K \cdot l \cdot \Delta + m', m' = 0, \ldots, K-1.$$

k is a subcarrier index corresponding to the resource element, l is a time domain symbol index corresponding to the resource element, m is an index of the reference signal sequence, $n_{PRB}$ is the resource block index, K represents the quantity of resource elements that carry the reference signal in the resource block, $n_{offset}$ is the resource block offset, and $\Delta$ is the inter-symbol offset.

In some embodiments, the subcarrier index of the resource element and the resource block index are defined relative to the bandwidth part BWP in which the resource element is located.

In other words, the subcarrier index of the resource element and the resource block index are determined based on the BWP in which the resource element is located.

In some embodiments, the time domain symbol index corresponding to the resource element is defined relative to a start symbol of a slot in which the resource element is located.

In other words, the time domain symbol index corresponding to the resource element is determined based on the start symbol of the slot in which the resource element is located.

In some embodiments, a value of the inter-symbol offset $\Delta$ is determined based on a subcarrier spacing corresponding to the resource block.

In some embodiments, the value of $\Delta$ is greater than or equal to a bandwidth of the BWP in which the resource element is located.

In some embodiments, the value of the inter-symbol offset is greater than or equal to N*M, where N is a ratio of a maximum subcarrier spacing used for the carrier to a minimum subcarrier spacing used for the carrier, and M is greater than or equal to the bandwidth of the BWP in which the resource element is located.

In some embodiments, the value of the inter-symbol offset is greater than or equal to L*M, where L is a maximum quantity of BWPs that can be configured for the carrier, and M is greater than or equal to the bandwidth of the BWP in which the resource element is located.

In some embodiments, the resource block offset is an offset between a minimum RB index of the BWP in which the resource element is located and a minimum carrier RB index.

In some embodiments, the resource block offset is notified by using higher layer signaling.

In some embodiments, the resource block offset is a value that is of a frequency domain location of the BWP in which the resource element is located and that is configured by using higher layer signaling.

In some embodiments, the BWP in which the resource element is located is an initial BWP, and a value of the resource block offset is 0.

According to a third aspect, a communications apparatus is provided. The communications apparatus includes units configured to perform steps according to the first aspect or the second aspect and the implementations thereof.

According to a fourth aspect, a communications device is provided. The communications device includes a processor, configured to invoke a computer program in a memory and execute the computer program, to enable the communications device to perform the method according to the first aspect or the second aspect and the implementations thereof.

According to a fifth aspect, a chip system is provided. The chip system includes a processor, configured to invoke a computer program in a memory and execute the computer program, to enable a device on which the chip system is installed to perform the method according to the first aspect or the second aspect and the implementations thereof.

According to a sixth aspect, a computer program product is provided. The computer program product includes computer program code. When the computer program code is run by a communications unit, a processing unit, a transceiver, or a processor in a communications device (for example, a terminal device or a network device), the communications device is enabled to perform the method according to the first aspect or the second aspect and the implementations thereof.

According to a seventh aspect, a computer-readable storage medium is provided. The computer-readable storage medium stores a program. The program enables a communications device (for example, a terminal device or a network device) to perform the method according to the first aspect or the second aspect and the implementations thereof.

According to the solutions provided in this disclosure, the terminal device can complete a process of channel estimation or channel sounding without needing to learn of the size of the system bandwidth. The network device does not need to notify the terminal device of the size of the system bandwidth, so that the flexible change of the carrier bandwidth can be supported, the use method for the spectrum can be adjusted, and the overheads of the signaling used for indicating the system bandwidth can be reduced.

DESCRIPTION OF EMBODIMENTS

Figure 1:
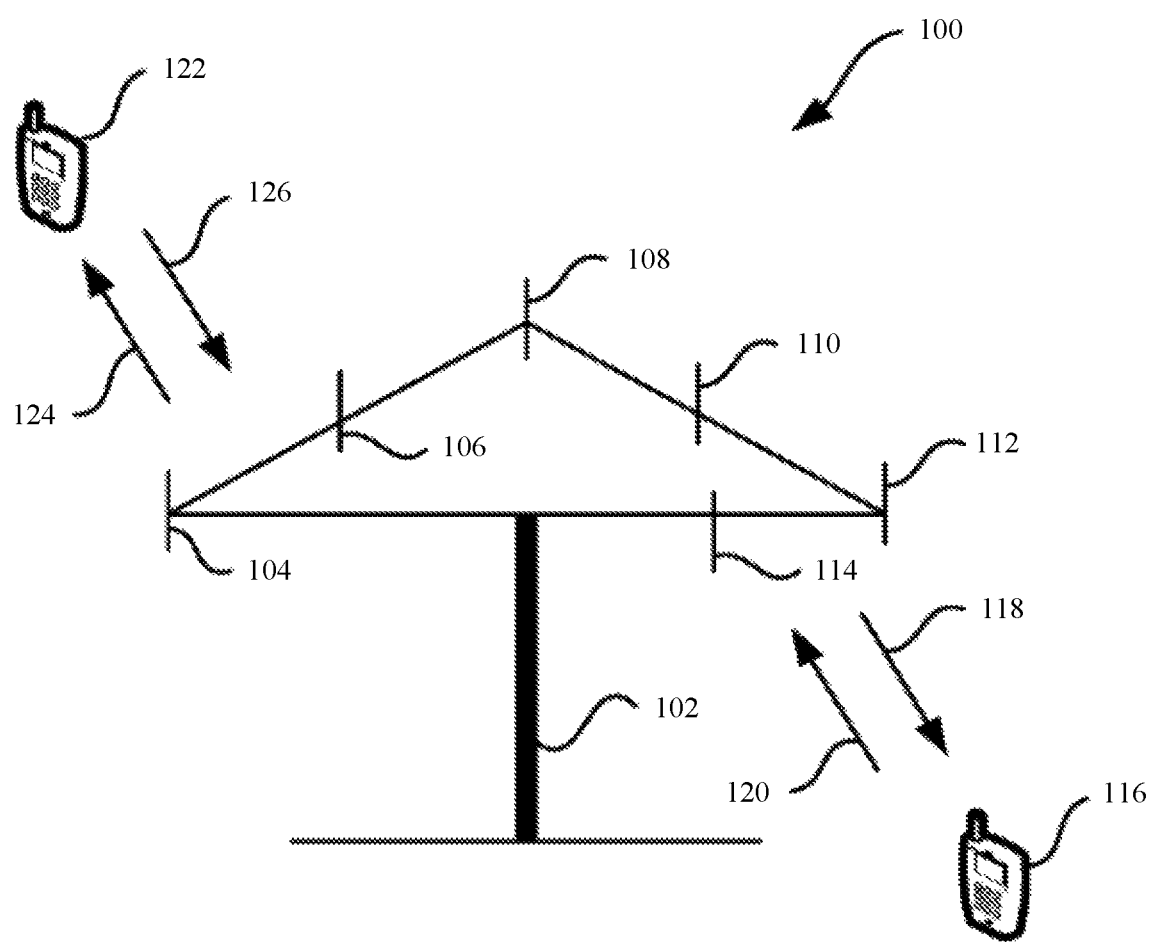
FIG. 1 is a schematic structural diagram of an example of a communications system according to this disclosure.

The following describes the technical solutions of this disclosure with reference to the accompanying drawings.

The technical solutions of various embodiments may be applied to various communications systems, for example, a global system for mobile communications (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, a future 5th generation (5th Generation, 5G) system, or a new radio (New Radio, NR) system.

By way of example and not limitation, in various embodiments, a terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (STAION, ST) in a WLAN, may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device having a wireless communication function, a computing device, another processing device connected to a wireless modem, an in-vehicle device, a wearable device, or a next-generation communications system, for example, a terminal device in a 5G network or a terminal device in a future evolved public land mobile network (Public Land Mobile Network, PLMN).

By way of example and not limitation, in various embodiments, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices, such as smartwatches or smart glasses, that can implement complete or partial functions without depending on smartphones; and devices, such as various smart bands or smart jewelries for vital sign monitoring, that focus on only one type of disclosure function and need to work with other devices such as smartphones.

In addition, in various embodiments, the terminal device may alternatively be a terminal device in an internet of things (Internet of Things, IoT) system. IoT is an important component for future information technology development, and has a main technical feature of connecting an object to a network by using a communications technology, to implement an intelligent network of human-machine interconnection and object-object interconnection.

In the embodiments of this disclosure, in an IOT technology, massive connections, deep coverage, and terminal power-saving may be realized by using, for example, a narrowband (NB) technology. For example, an NB includes only one resource block (RB). For example, a bandwidth of the NB is only 180 KB. To achieve massive access, terminals are required to be discrete in access. According to a communication method in the embodiments of this disclosure, a problem of congestion caused when massive terminals access a network through the NB in the IOT technology can be effectively resolved.

In various embodiments, a network device may include an access network device or a core network device.

The access network device may be a device configured to communicate with a mobile device, such as an access network device. The access network device may be an access point (AP) in a WLAN or a base transceiver station (BTS) in GSM or CDMA, or may be a NodeB (NB) in WCDMA or a gNB in a new radio (NR) system, or may be an eNodeB (eNB or eNodeB) in LTE, a relay station, an access point, an in-vehicle device, a wearable device, an access network device in a future 5G network, an access network device in a future evolved PLMN network, or the like.

Moreover, in the embodiments of this disclosure, the access network device provides a service for a cell, and the terminal device communicates with the access network device by using a transmission resource (for example, a frequency domain resource, in other words, a spectrum resource) used by the cell. The cell may be a cell corresponding to the access network device (for example, a base station). The cell may belong to a macro base station, or may belong to a base station corresponding to a small cell. The small cell herein may include: a metro cell (Metro cell), a micro cell, a pico cell, a femto cell, and the like. These small cells have features of small coverage and low transmit power, and are suitable for providing high-speed data transmission services.

In addition, a plurality of cells may work at a same frequency on a carrier in an LTE system or a 5G system. In some special scenarios, it may be considered that a concept of the carrier is equivalent to that of a cell. For example, in a carrier aggregation (CA) scenario, when a secondary component carrier is configured for UE, a carrier index of the secondary component carrier and a cell identity (Cell ID) of a secondary serving cell operating on the secondary component carrier are both carried. In this case, it may be considered that a concept of a carrier is equivalent to that of a cell. For example, access by UE to a carrier is equivalent to access to a cell.

The core network device may be connected to a plurality of access network devices, is configured to control the access network device, and may distribute data received from a network side (for example, the Internet) to the access network device.

The functions and various implementations of the terminal device, access network device, and core network device enumerated above are only examples for description, and this disclosure is not limited thereto.

In various embodiments, the terminal device or the network device includes a hardware layer, an operating system layer running above the hardware layer, and an disclosure layer running above the operating system layer. The hardware layer includes hardware such as a central processing unit (Central Processing Unit, CPU), a memory management unit (MMU, Memory Management Unit), and a memory (also referred to as a main memory). The operating system may be any one or more computer operating systems, such as a Linux operating system, a Unix operating system, an Android operating system, an iOS operating system, or a windows operating system, that implement service processing by using a process. The disclosure layer includes disclosures such as a browser, a contact list, a word processing software, and an instant messaging software. In addition, an example structure of an execution body of the method provided in various embodiments is not particularly limited, provided that a program recording code of the method provided in the embodiments can be run, to perform communication based on the method provided in the embodiments of this disclosure. For example, the execution body of the method provided in the embodiments may be the terminal device, the network device, or a function module that can invoke the program and execute the program in the terminal device or the network device.

In addition, aspects or features in various embodiments may be implemented as a method, an apparatus, or a product that uses standard programming and/or engineering technologies. The term "product" used herein covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (Compact Disc, CD) or a digital versatile disc (Digital Versatile Disc, DVD), a smart card, and a flash memory component (for example, an erasable programmable read-only memory (Erasable Programmable Read-Only Memory, EPROM), a card, a stick, or a key drive). In addition, various storage media described in this specification may indicate one or more devices and/or other machine-readable media that are configured to store information. The term "machine-readable media" may include but is not limited to, a radio channel, and various other media that can store, contain, and/or carry an instruction and/or data.

It should be noted that in various embodiments, a plurality of disclosure programs may be run on the disclosure layer. In this case, an application program for performing the communication method in the embodiments of this disclosure and an disclosure program that is configured to control a receive end device to complete an action corresponding to received data may be different disclosure programs.

FIG. 1 is a schematic diagram of a system 100 to which a communication method in an embodiment of this disclosure can be applied. As shown in FIG. 1, the system 100 includes an access network device 102, and the access network device 102 may include one antenna or a plurality of antennas, for example, an antenna 104, an antenna 106, an antenna 108, an antenna 110, an antenna 112, and an antenna 114. In addition, the access network device 102 may additionally include a transmitter chain and a receiver chain, and a person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The access network device 102 may communicate with a plurality of terminal devices (for example, a terminal device 116 and a terminal device 122). However, it may be understood that the access network device 102 may communicate with any quantity of terminal devices similar to the terminal device 116 or the terminal device 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antenna 112 and the antenna 114, where the antenna 112 and the antenna 114 send information to the terminal device 116 through a forward link (which is also referred to as a downlink) 118, and receive information from the terminal device 116 through a reverse link (which is also referred to as an uplink) 120. In addition, the terminal device 122 communicates with the antenna 104 and the antenna 106, where the antenna 104 and the antenna 106 send information to the terminal device 122 through a forward link 124, and receive information from the terminal device 122 through a reverse link 126.

For example, in a frequency division duplex (FDD) system, different frequency bands may be used for the forward link 118 and the reverse link 120, and different frequency bands may be used for the forward link 124 and the reverse link 126.

For another example, in a time division duplex (TDD) system and a full duplex system, a same frequency band may be used for the forward link 118 and the reverse link 120, and a same frequency band may be used for the forward link 124 and the reverse link 126.

Each antenna (or an antenna group including a plurality of antennas) and/or an area designed for communication are/is referred to as a sector of the access network device 102. For example, an antenna group may be designed to communicate with a terminal device in a sector within a coverage area of the access network device 102. The access network device may send, by using a single antenna or through multi-antenna transmit diversity, a signal to all terminal devices in the sector corresponding to the access network device. In a process in which the access network device 102 communicates with the terminal devices 116 and 122 respectively by using the forward links 118 and 124, a transmit antenna of the access network device 102 may improve signal-to-noise ratios of the forward links 118 and 124 through beamforming. In addition, compared with the manner in which the access network device sends, by using a single antenna or through multi-antenna transmit diversity, a signal to all terminal devices served by the access network device, when the access network device 102 sends, through beamforming, a signal to the terminal devices 116 and 122 that are randomly distributed within the related coverage area, less interference is caused to a mobile device in an adjacent cell.

In a given time, the access network device 102, the terminal device 116, or the terminal device 122 may be a wireless communications sending apparatus and/or a wireless communications receiving apparatus. When sending data, the wireless communications sending apparatus may encode the data for transmission. For example, the wireless communications sending apparatus may obtain (for example, generate, receive from another communications apparatus, or store in a memory) a particular quantity of data bits to be sent to the wireless communications receiving apparatus over a channel. The data bit may be included in a transport block (or a plurality of transport blocks) of the data, and the transport block may be segmented to produce a plurality of code blocks.

In addition, the communications system 100 may be a PLMN network, a D2D network, a M2M network, an IoT network, or another network. FIG. 1 is merely a simplified schematic diagram as an example. Another access network device may be further included in the network, but is not shown in FIG. 1.

The following describes in detail a resource used in the communication method in this disclosure.

In this embodiment of this disclosure, a resource element (Resource Element, RE) may be a minimum physical resource, and one RE may correspond to one subcarrier in one OFDM symbol (a symbol for short in the following).

In new radio (NR), a basic time unit of uplink/downlink resource scheduling is a slot (slot), and one slot includes 14 OFDM symbols in terms of time.

In 5th wireless access system standard NR, a basic unit in frequency domain is a subcarrier, and a subcarrier spacing may be 15 kHz, 30 kHz, or the like. In an NR physical layer, a unit of a downlink frequency domain resource is a resource block (RB).

In the embodiments of this disclosure, each RB includes one symbol in time domain and 12 contiguous subcarriers in frequency domain.

The subcarrier is a basic unit in frequency domain, and a subcarrier spacing (or a width of the subcarrier) may be 15 kHz, 30 kHz, 60 kHz, 120 kHz, 240 kHz, 480 kHz, or the like.

By way of example and not limitation, the communication method in various embodiments may be applied to, for example, a high-bandwidth communications system.

For example, with an increase of mobile subscribers and emergence of large-capacity services (for example, a high-definition video service), an important aspect required for evolution of mobile communications to a future 5G system, NR system, or the like is to support a high bandwidth. A higher bandwidth indicates more bandwidth resources used for data transmission and a larger traffic volume that can be supported. In a communications system in which a carrier bandwidth is a high bandwidth, a bandwidth supported by UE may be smaller than the carrier bandwidth in consideration of costs of the UE and a traffic volume of the UE. A higher bandwidth supported by the UE indicates a stronger processing capability of the UE, a higher data transmission rate of the UE, and higher design costs of the UE. For example, in a 5G system, a maximum carrier bandwidth may be 400 megahertzes (MHz), and a radio frequency bandwidth capability of the UE may be 20 MHz, 50 MHz, 100 MHz, or the like. In a wireless communications system, radio frequency bandwidth capabilities of different UEs may be the same or different.

In the communications system in which the carrier bandwidth is a large bandwidth, because the radio frequency bandwidth capability of the UE is smaller than the carrier bandwidth, a concept of bandwidth part (Bandwidth Part or carrier Bandwidth Part, BWP) is proposed. To be specific, one BWP includes several consecutive RBs in frequency domain.

In the technology, the terminal device cannot learn of a size of a system bandwidth, and only know a size of a BWP. Therefore, the communication method provided in this disclosure may be applied to a BWP technology.

In the embodiments of this disclosure, a base station may configure one or more downlink/uplink bandwidth parts (BWP) for the terminal device, the BWP is a subset in a system carrier bandwidth, and the plurality of bandwidth parts may overlap (overlap) in frequency domain. The base station may activate, for the UE, one BWP from the at least one BWP configured for the UE. The UE may receive a physical downlink shared channel (PDSCH) and a physical downlink control channel (PDCCH) in the activated BWP, and the UE may send an uplink shared channel (PUSCH) and an uplink control channel (PUCCH) to the base station in the activated BWP.

In NR, a concept of control resource set (CORESET) is proposed. A control resource set includes a plurality of consecutive or inconsecutive segments, where each segment includes consecutive RBs in frequency domain and consecutive OFDM symbols in time domain. The base station may configure one or more control resource sets for each terminal device, and the base station may send a control channel to the terminal device by using the control resource set.

In NR, a PDCCH transmitted in each UE CORSET includes REGs (Resource Element Group, resource element group), the REG includes one OFDM symbol in time domain and one RB in frequency domain, and the REG includes a DMRS signal used for demodulating the PDCCH.

The technology provided in this disclosure may be applied to a determining process of a reference signal sequence unit corresponding to each RE in each REG.

The following describes, with reference to FIG. 2, in detail a channel estimation method 200 for a terminal device (denoted as a terminal device #A in the following for ease of understanding and description) that has been connected to a network device (for example, an access network device, which is denoted as a network device #A in the following for ease of understanding and description).

In S210, the network device #A may determine a location of an RE to which a reference signal is mapped. For ease of understanding and description, the following describes in detail steps in the method 200 by using a processing process for an RE #A as an example.

Similarly, the terminal device #A may determine a location of the RE #A.

In S220, the network device #A may determine a reference signal sequence r(m) corresponding to the RE #A, where m is an index of an element in the reference signal sequence r(m).

In this embodiment, the index m may be determined by using the following parameters.

A. Resource Block Index

In this embodiment, the resource block index may be an index, of a resource block (denoted as an RB #A in the following for ease of understanding and distinguishing) in which the RE #A is located, in a BWP (denoted as a BWP #A in the following for ease of understanding and distinguishing) in which the resource block is located. The resource block index may be defined relative to the BWP in which the resource block is located. For example, the resource block index may be defined relative to a minimum RB index or a maximum RB index of the BWP or an index of an RB at a central location.

The BWP #A may include a plurality of PRBs (including the PRB #A), and the plurality of PRBs may be numbered in the BWP #A. For example, by way of example and not limitation, the PRBs in the BWP #A may be numbered in ascending order of frequencies. That is, a number of a PRB corresponding to a start location of numbers of the PRBs in the BWP #A may be 0. For ease of understanding and distinguishing, the PRB corresponding to the start location of the numbers of the PRBs in the BWP #A is denoted as a PRB #0 below. That is, the resource block index may be determined based on an offset of the PRB #A relative to the PRB #0.

B. Quantity of Resource Elements of the Reference Signal in the Resource Block

In this embodiment, the quantity of resource elements of the reference signal in the resource block may be a quantity of resource elements REs used for the reference signal in one resource block RB (for example, the PRB #A). Quantities of resource elements used in different resource blocks may be the same or different. In addition, locations of the resource elements used in the different resource blocks may be the same or different.

By way of example and not limitation, in this embodiment, the quantity of resource elements of the reference signal in the resource block may be 3. For example, if one PRB includes 12 subcarriers that are numbered from 0 to 11, the REs that carry the reference signal may correspond to subcarriers numbered 1, 5, and 9, or may correspond to subcarriers numbered 0, 4, and 8 or subcarriers numbered 2, 7, and 10. For another example, the quantity of resource elements of the reference signal in the resource block may be 4, where the four REs are respectively subcarriers numbered 0, 3, 6, and 9, subcarriers numbered 1, 4, 7, and 10, or subcarriers numbered 2, 5, 8, and 11.

C. Resource Block Offset

The resource block offset is an offset of the resource block relative to a reference point in frequency domain.

The offset may be predefined, may be notified by using higher layer signaling such as RRC signaling, a system message such as a MIB, an RMSI, or a SIB, or dynamic signaling such as DCI, may be implicitly deduced by using another parameter, or may be obtained by using one of combinations of the foregoing manners.

The reference point may be predefined, may be notified by using higher layer signaling such as RRC signaling, a system message such as a MIB, an RMSI, or a SIB, or dynamic signaling such as DCI, may be implicitly deduced by using another parameter, or may be obtained by using one of combinations of the foregoing manners.

In this embodiment, the resource block offset may be an offset of the BWP relative to a carrier RB (Carrier RB) index 0, or may be an offset of the minimum RB index of the BWP relative to a minimum RB index of a carrier RB. The reference point may be the carrier RB index 0.

The resource block offset may be an offset relative to the minimum RB index of the BWP. In this case, a value of the offset is 0.

The resource block offset may be an offset relative to a synchronization block (SS Block) or a minimum RB index of an SS. In this case, a value of the offset may be an offset of the BWP relative to the synchronization block.

By way of example and not limitation, in this embodiment of this disclosure, the resource block offset may be determined based on any of the following manners.

Manner 1

In this embodiment of this disclosure, the offset of the BWP may indicate an offset of the BWP #A relative to a reference point (denoted as a reference point #A in the following for ease of understanding and description). For example, the offset of the BWP is an offset that is of a PRB (namely, the PRB #0) at a start location in the BWP #A and that is relative to a reference point.

By way of example and not limitation, in this embodiment of this disclosure, the network device #A may set the reference point #A by using the following method.

Method a

The reference point #A may be a carrier resource block, and for example, may be an RB with a minimum index value in carrier resource blocks.

For example, the network device #A may number RBs in a used carrier in ascending or descending order of frequencies, to obtain carrier RB indexes. A network device or a base station may configure one or more BWPs for different UEs in one carrier.

A location of each BWP may be notified by using higher layer signaling. For example, a start location or a bandwidth of the BWP is notified by using RRC signaling.

A location of an initial BWP may be implicitly deduced. For example, a control resource set is notified by using a broadcast channel or a MIB, and the location of the initial BWP is obtained by using a frequency-domain start location and a bandwidth of the control resource set.

An index of an RB may be defined relative to each BWP. For example, RBs in the BWP may be sequentially defined as a PRB 0, a PRB 1, a PRB 2 . . . in ascending order or descending order of frequencies.

By way of example and not limitation, when accessing the network device #A, the terminal device #A may determine a frequency domain location corresponding to the synchronization signal block (Synchronization Signal Block, SSB).

In addition, the network device #A may notify the terminal device #A of an offset (denoted as an offset #1 in the following for ease of understanding and distinguishing) of common physical resource blocks relative to the synchronization signal block in frequency domain.

By way of example and not limitation, the network device #A may send, through, for example, radio resource control (Radio Resource Control, RRC), indication information of the offset #1 to a plurality of terminal devices including the terminal device #A.

Therefore, the terminal device #A may determine the common physical resource blocks based on the frequency domain location of the synchronization signal block and the offset #1.

In this embodiment, the network device #A may determine one PRB in the common physical resource blocks, for example, a PRB whose carrier RB index is 0, as the reference point #A.

Therefore, the terminal device #A may determine the reference point #A according to an indication of the network device #A.

In some embodiments, the reference point #A may be a preset PRB in the plurality of common physical resource blocks. For example, the reference point #A may be a PRB stipulated in a communication protocol in the plurality of common physical resource blocks.

In some embodiments, as in this embodiment, the network device #A may send indication information #1 to the terminal device #A, and the indication information #1 may be used to indicate a location of the reference point #A.

For example, the indication information #1 may be used to indicate a location of a PRB whose common PRB index is 0. In this case, the terminal device #A may determine a PRB indicated by the indication information #1 as the PRB whose common PRB index is 0, and determine the PRB as the reference point #A.

It should be noted that the PRB (for example, the PRB whose common PRB index is 0) corresponding to the reference point #A may alternatively be a PRB with a minimum PRB index in the carrier used by the network device #A.

It should be understood that the determining method for and process of the reference point #A that are enumerated above are only examples for description, and this disclosure is not limited thereto. For example, the reference point #A may be any PRB in a system bandwidth, and the network device #A may notify the terminal device #A of an offset between the reference point #A and the synchronization signal block, so that the terminal device #A determines a frequency domain location of the reference point #A.

In this way, the terminal device #A can determine a location of the frequency domain location of the reference point #A.

It should be noted that in this embodiment, the network device may configure a control resource set (CORESET) for a terminal device in a BWP allocated to the terminal device (for example, the terminal device #A), and the CORESET may be used to carry a PDCCH for the terminal device. To be specific, the CORESET may be referred to as a dedicated CORESET to the terminal device. In this case, the reference point #A may be a reference point used to determine a CORESET of each of a plurality of terminal devices.

Therefore, the network device #A may determine an offset (denoted as an offset #2 in the following for ease of understanding and description) of the PRB #0 relative to the reference point #A.

In addition, the network device #A uses the offset #2 as the resource block offset.

Similarly, the terminal device #A may also determine the offset #2 and use the offset #2 as the resource block offset.

Figure 3:
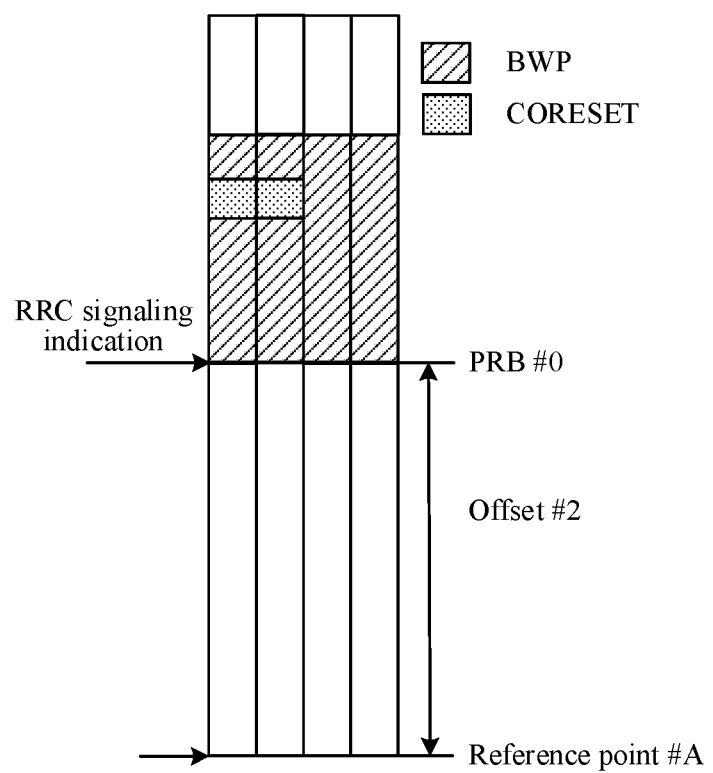
FIG. 3 is a schematic diagram of an example of resource configuration according to this disclosure.

FIG. 3 is a schematic diagram of the foregoing offsets.

Method b

The network device #A may send indication information #2 to the terminal device #A, and the indication information #2 may be used to indicate a value of the resource block offset. Therefore, the terminal device #A may determine the resource block offset according to the indication information #2.

It should be noted that the indication information #1 and the indication information #2 may be both used when the resource block offset is determined, or only one of the indication information #1 and the indication information #2 may be used when the resource block offset is determined. This is not particularly limited in this disclosure. In addition, when the indication information #1 and the indication information #2 are both used, the indication information #1 and the indication information #2 may be carried in a same message or same signaling, or the indication information #1 and the indication information #2 may be carried in different messages or different signaling. This is not particularly limited in this disclosure.

D. Inter-Symbol Offset

For example, the inter-symbol offset (denoted as) is used to indicate an offset value parameter of an index of the reference signal sequence between adjacent time domain symbols.

In this embodiment of this disclosure, the inter-symbol offset $\Delta$ may be determined in any of the following manners.

Manner 1

The network device #A and the terminal device #A may determine a mapping relationship (denoted as a mapping relationship #A) between a plurality of pieces of system information and a plurality of pieces of system information.

Therefore, the network device #A and the terminal device #A may determine, based on system information corresponding to an RE #A, a preset system parameter $\Delta$ that is currently used.

Herein, the system information may include information about any of the following parameters: a system parameter numerology, a subcarrier spacing, or a cyclic prefix (CP).

By way of example and not limitation, the following Table 1 shows an example of the mapping relationship #A.

TABLE 1

| Index of a system parameter | Subcarrier spacing (kHz) | Preset system parameter $\Delta$ (quantity of PRBs) |
| --- | --- | --- |
| 0 | 15 | $\geq 4 * 275$ |
| 1 | 30 | $\geq 2 * 275$ |
| 2 | 60 | $\geq 275$ |
| 3 | 120 | $\geq 276$ |
| 4 | 240 | $\geq 138$ |
| 5 | 480 | $\geq 69$ |

In this case, an example in which a subcarrier spacing (to be specific, a subcarrier spacing corresponding to the RE #A) used by the terminal device #A is a subcarrier of 15 kHz is used.

A system may support both a subcarrier whose subcarrier spacing is 15 kHz and a subcarrier whose subcarrier spacing is 60 kHz. Therefore, for the terminal device #A, a maximum bandwidth in the system includes 4*275 PRBs, so that it can be determined that Δ≥4*275.

In this embodiment, the mapping relationship #A may be stipulated in a communication protocol, or the mapping relationship #A may be entered into the network device #A and the terminal device #A by an administrator or a user, or the mapping relationship #A may be set in the network device #A and the terminal device #A by a manufacturer or an operator, and this is not particularly limited in this disclosure, provided that it is ensured that the mapping relationship #A determined by the network device #A is the same as that determined by the terminal device #A.

Manner 2

A unique inter-symbol offset Δ may be stipulated in a communications system. In this case, the inter-symbol offset Δ may be greater than or equal to a possible maximum value of the offset #2. For example, if the possible maximum value of the offset #2 is 4*275 or 4*276, Δ≥4*275 or Δ 4*276.

It should be understood that the values of the preset system parameter Δ that are enumerated above are only examples for description, and this disclosure is not limited thereto. The value of the preset system parameter Δ may be appropriately changed based on an actual requirement.

By way of example and not limitation, for example, a value of the inter-symbol offset Δ may be greater than or equal to a value of N*M, where N is a ratio of a maximum subcarrier spacing supported by the carrier to a minimum subcarrier spacing supported by the carrier. For example, assuming that maximum and minimum subcarrier spacings in the carrier are respectively 60 kHz and 15 kHz, a value of N is 4. A value of M may be a preset value. For example, the value of M may be greater than or equal to a bandwidth of the BWP #A. For another example, M is equal to 275, 276, or an integer multiple of 275 or 276.

For another example, the value of the inter-symbol offset Δ may be greater than or equal to L*M, where L is a maximum quantity of BWPs that may be configured for the carrier. For example, if the system bandwidth is 60 kHz, and in the communications system, a terminal device that uses a subcarrier spacing of 15 kHz may exist, a maximum quantity of BWPs not overlapping in frequency domain that can be configured is 60/15=4, and a value of L is 4. For example, at most four BWPs are configured for the carrier. A value of M may be a preset value. For example, the value of M may be greater than or equal to a bandwidth of the BWP #A. For another example, M is equal to 275, 276, or an integer multiple of 275 or 276.

When the terminal device initially accesses the system, the terminal device needs to obtain a PDCCH in one CORESET, to correctly receive a PDSCH to obtain a system message (Remaining minimum system information, RMSI), and the CORESET may be referred to as an RMSI CORESET. The RMSI CORESET is located in an initial downlink BWP (Initial DL BWP), and both a bandwidth and a frequency domain location that are of the RMSI CORESET are the same as those of the initial DL BWP. All UEs that access a same carrier need to receive a PDCCH in an RMSI CORESET in an initial DL BWP.

It should be noted that the inter-symbol offset may be a bandwidth (using an RB as a unit) of the BWP in which the RMSI CORESET is located in a case of the RMSI CORESET.

Therefore, the network device #A and the terminal device #A may determine the index m of the reference signal sequence based on the following formula 1:

$$m = K \cdot (n_{PRB} + n_{offset}) + K \cdot l \cdot \Delta + m', m' = 0, 1, K-1 \qquad \text{formula 1}$$

m is the index of the reference signal sequence, and l represents a time domain symbol index of the resource element RE #A.

$n_{PRB}$ is the resource block index, K represents the quantity of resource elements that carry the reference signal in the resource block RB, and $n_{offset}$ and Δ are respectively the resource block offset or the inter-symbol offset. $n_{PRB}$ may be defined relative to the BWP; and l is defined relative to a start symbol of a slot.

By way of example and not limitation, for example, when the RE #A is used to carry a reference signal of the PDCCH, a value of K may be 3. $n_{offset}$ represents the resource block offset. Δ represents the inter-symbol offset.

Therefore, the network device #A and the terminal device #A may determine a reference sequence r(m) based on the index m.

By way of example and not limitation, the reference signal sequence may be generated based on a Gold (Gold) sequence.

That is, $$r(m) = \frac{1}{\sqrt{2}}(1 - 2 \cdot c(2m)) + j\frac{1}{\sqrt{2}}(1 - 2 \cdot c(2m+1)).$$

c (i) represents a Gold sequence having an index of i.

It should be understood that the generation manner of the reference signal sequence that is enumerated above is merely an example for description, and this disclosure is not limited thereto. Other manners in which the reference signal sequence can be generated all fall within the protection scope of this disclosure. For example, the reference signal sequence may alternatively be generated based on a sequence such as a pseudo-random sequence.

In S230, the network device #A may map the sequence r(m) to a resource k, l) based on the following formulas 2 to 4:

$$a_{k,l}^{(p,\mu)} = \beta \cdot r(m)$$

$$m = K \cdot (n_{PRB} + n_{offset}) + K \cdot l \cdot \Delta + m', m' = 0, 1, K-1$$

$$l = l_0 + l', l' = 0, \ldots, N-1$$

$$k = N_{sc}^{RB} n_{PRB} + k', k' = P_0, P_1, \ldots P_{K-1}$$

$a_{k,l}^{(p,\mu)}$ represents a symbol at the location (k, l) of the resource element to which the reference signal is mapped, and k and/are respectively a subcarrier index and the time domain symbol index that correspond to the resource element. To be specific, l represents a sequence number of a symbol corresponding to the RE #A, and k represents a sequence number of a subcarrier corresponding to the RE #A. p is a number of an antenna port through which the reference signal is sent. μ is an index number corresponding to a subcarrier spacing of the reference signal. In other words, μ is an index number of a system parameter of a subcarrier corresponding to the RE #A. β is a preset value and is determined based on a power factor and/or an orthogonal cover code (OCC). r(m) represents a reference signal sequence unit carried on the RE #A, and m represents an index of the reference signal sequence unit.

$l_0$ represents an index of a start symbol of a CORESET in the slot, N represents a quantity of symbols that are occupied by the CORESET in the slot, and the network device #A may notify the terminal device #A of a value of $l_0$ and a value of N by using, for example, RRC signaling.

In the formula 4, $N_{sc}^{RB}$ represents a quantity of subcarriers included in one PRB. For example, in this embodiment of this disclosure, a value of $N_{sc}^{RB}$ may be 12. $P_0, P_1, \ldots P_{K-1}$ are respectively locations of the REs that carry the reference signal in the PRB #A. For example, for the carried reference signal of the PDCCH, k'=$P_1, P_2, P_3$. By way of example and not limitation, in this embodiment of this disclosure, it may be set that $P_1=1$, $P_2=5$, and $P_3=9$.

Similarly, the terminal device #A may determine a modulation symbol that needs to be mapped on each of the REs that are used to carry the reference signal in the CORESET.

Figure 4:
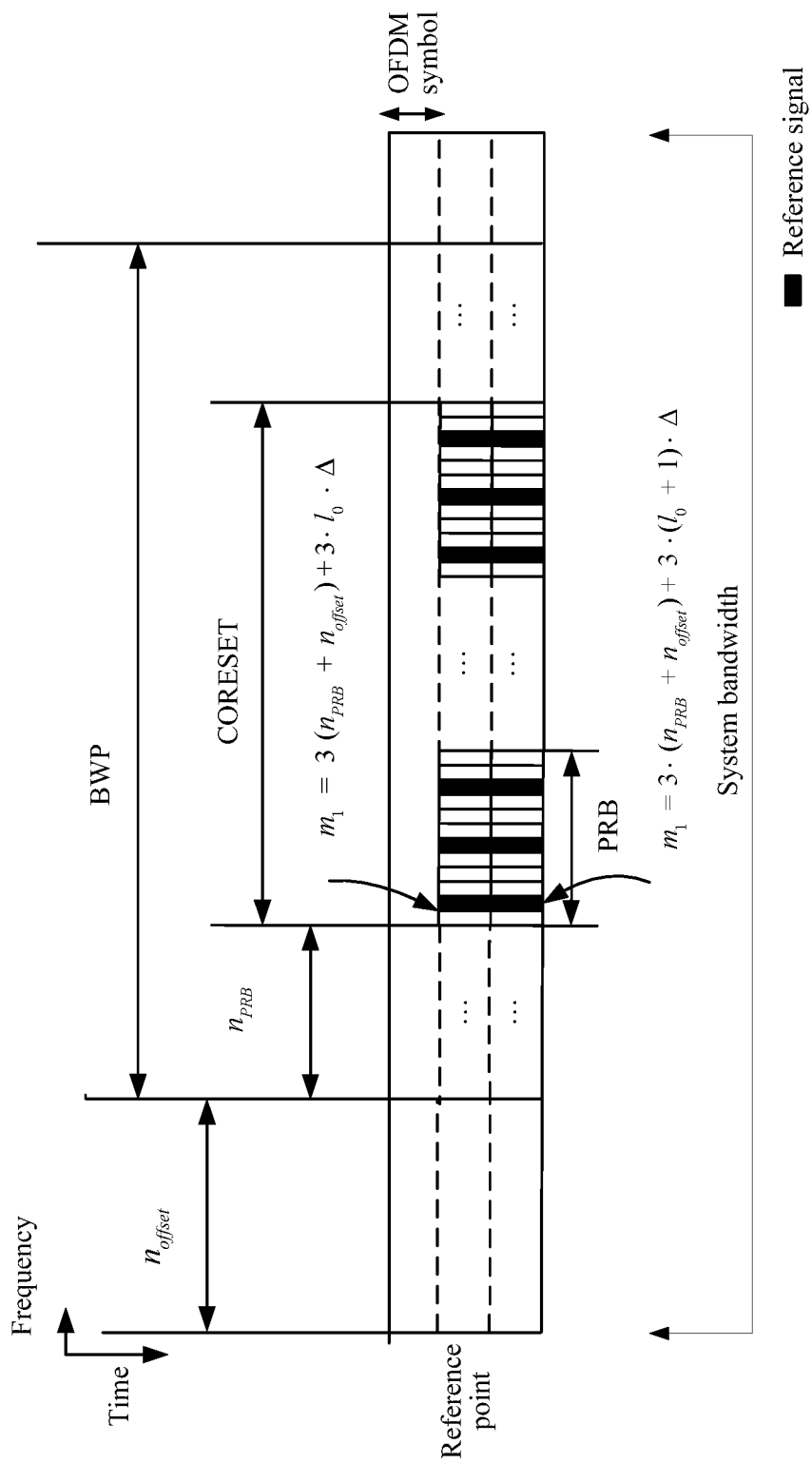
FIG. 4 is a schematic diagram of an example of a reference signal mapping manner according to this disclosure.

Then, the network device #A may send, in the CORESET (including the RE #A), the modulation symbol that is of the reference signal and that is generated as shown above. FIG. 4 shows an example of a pattern in which the reference signal is in the CORESET.

The terminal device #A may determine the reference signal sequence unit, namely, r(m), corresponding to the RE #A based on the foregoing formula 1. In addition, the terminal device #A may perform channel estimation or channel sounding based on the reference signal received on the RE #A and r(m), and a specific method for and process of the channel estimation may be similar to those in the prior art. Herein, to avoid repetition, a detailed description thereof is omitted.

The following describes in detail a method for performing channel estimation by a terminal device (denoted as a terminal device #B in the following for ease of understanding and description) that initially accesses a network device (for example, an access network device, which is denoted as a network device #B in the following for ease of understanding and description).

In this scenario, a value of $n_{offset}$ in the foregoing formula 1 is different from that in the foregoing method 200. Herein, the value of $n_{offset}$ is mainly described in detail.

In this embodiment, the network device #A may determine a value of $n_{PRB}$ and the value of $n_{offset}$ in any of the following manners.

In an initial access process, a BWP used by the terminal device #B is an initial downlink (Initial DL) BWP. In addition, the network device #B may notify the terminal device #B of a frequency domain location (for example, a start frequency domain location and a maximum frequency domain location) of the initial DL BWP, and the process may be similar to that in the prior art. For example, the frequency domain location of the initial DL BWP may be determined based on a synchronization signal block (SS Block, Synchronization signal Block). Herein, to avoid repetition, a detailed description thereof is omitted.

In this case, the network device #B and the terminal device #B may determine the value of $n_{offset}$ in any of the following manners.

Manner A

Figure 5:
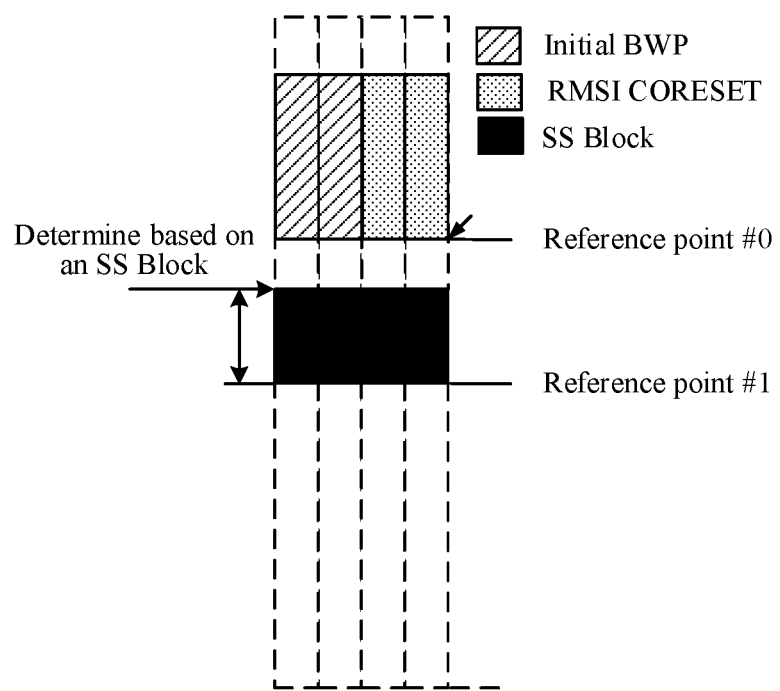
FIG. 5 is a schematic diagram of another example of resource configuration according to this disclosure.

The network device #B and the terminal device #B may determine a start location of the initial DL BWP as the reference point #A, as shown by a reference point #0 in FIG. 5.

In this case, the value of $n_{offset}$ may be 0.

For an RMSI CORESET or UE that performs initial access, $n_{offset}$ is equal to 0 or a bandwidth of the RMSI CORESET or a bandwidth of an initial BWP.

The inter-symbol offset is $\Delta \geq N \cdot M$, where $N \geq 4$, and $N \geq 275$ or $N \geq 276$.

Alternatively, the inter-symbol offset 4 is equal to the bandwidth of the RMSI CORESET or the bandwidth of the initial BWP.

Manner B

The network device #B and the terminal device #B may determine a start location of the SS block as the reference point #A, as shown by a reference point #1 in FIG. 5.

In this case, the value of $n_{offset}$ may be an offset between the start location of the SS block and a start location of the initial DL BWP.

In addition, in method 300, the inter-symbol offset may be a quantity of PRBs included in the initial DL BWP.

$n_{offset}$ may be obtained by using a frequency domain location parameter [DL-BWP-loc] in a higher layer signaling parameter BWP.

The inter-symbol offset is $\Delta N \cdot M$, where $N \geq 4$, and $N \geq 275$ or $N \geq 276$.

Figure 6:
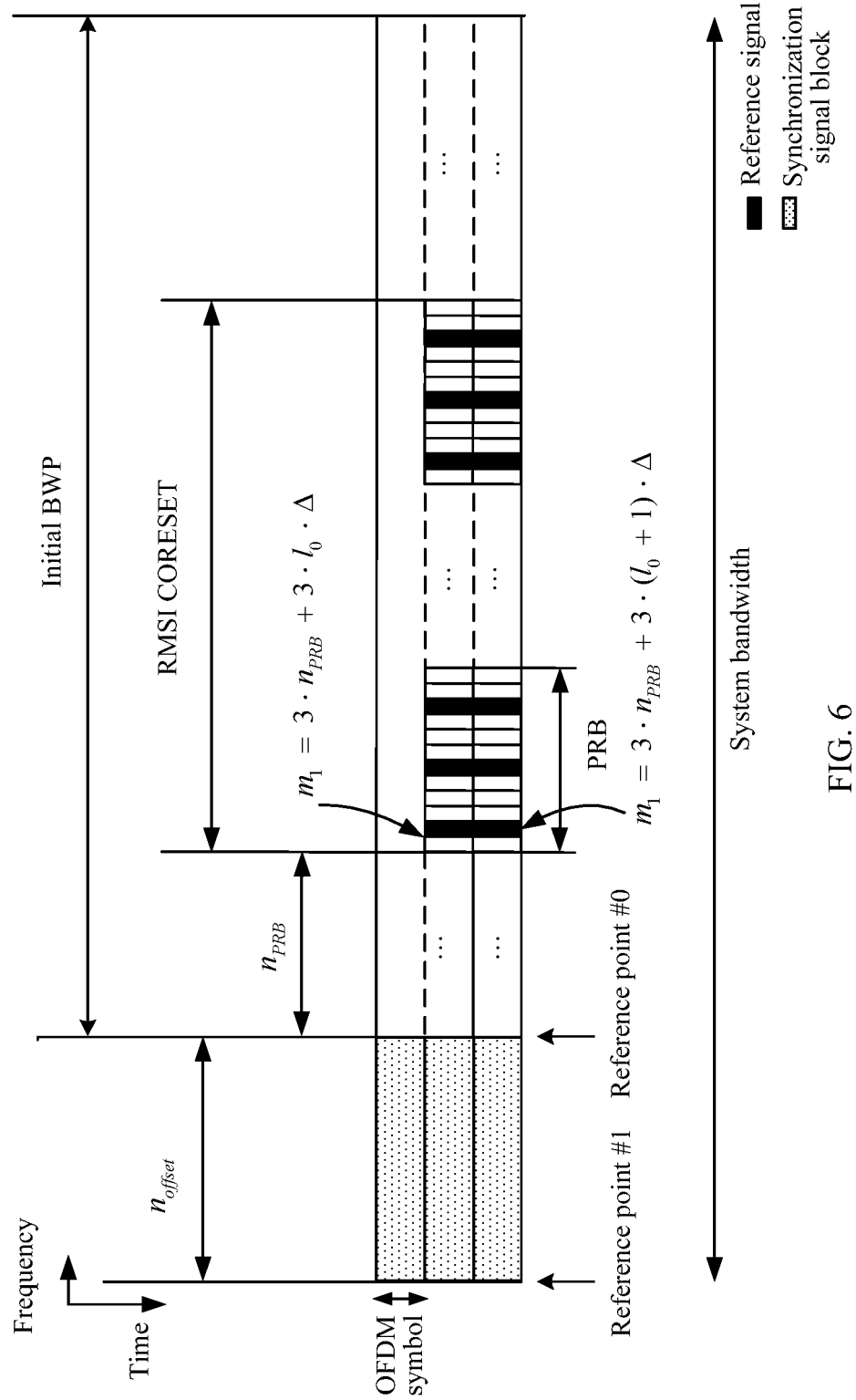
FIG. 6 is a schematic diagram of another example of a reference signal mapping manner according to this disclosure.

FIG. 6 is a schematic diagram of a reference signal mapping manner in this scenario.

According to the solution provided herein, the terminal device can complete the process of channel estimation or channel sounding without needing to learn of the size of the system bandwidth. The network device does not need to notify the terminal device of the size of the system bandwidth, so that a flexible change of a carrier bandwidth can be supported, a use method for a spectrum can be adjusted, and overheads of signaling used for indicating the system bandwidth can be reduced.

Figure 7:
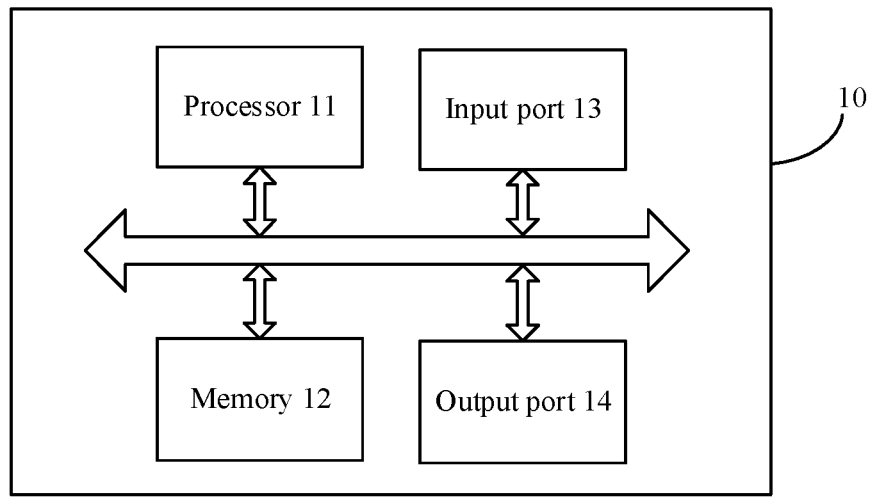
FIG. 7 is a schematic block diagram of an example of a communications apparatus according to this disclosure.

Based on the foregoing method, FIG. 7 is a first schematic diagram of a communications apparatus 10 according to an embodiment of this disclosure. As shown in FIG. 7, the apparatus 10 may be a terminal device (for example, the foregoing terminal device #A), or may be a chip or a circuit, for example, a chip or a circuit that may be disposed in the terminal device. The terminal device may correspond to the terminal device in the foregoing method.

The apparatus 10 may include a processor 11 (namely, an example of a processing unit) and a memory 12. The memory 12 is configured to store an instruction. The processor 11 is configured to execute the instruction stored in the memory 12, to enable the apparatus 20 to implement the steps performed by the terminal device (for example, the terminal device #A) in the method corresponding to FIG. 2.

Further, the apparatus 10 may include an input port 13 (namely, an example of a communications unit) and an output port 14 (namely, another example of the communications unit). Further, the processor 11, the memory 12, the input port 13, and the output port 14 may communicate with each other through an internal connection path, to transfer a control and/or data signal. The memory 12 is configured to store a computer program. The processor 11 may be configured to invoke the computer program from the memory 12 and run the computer program, to control the input port 13 to receive a signal, and control the output port 14 to send a signal, thereby completing the steps of the terminal device in the foregoing method. The memory 12 may be integrated into the processor 11, or may be disposed separate from the processor 11.

In some embodiments, if the apparatus 10 is the terminal device, the input port 13 is a receiver, and the output port 14 is a transmitter. The receiver and the transmitter may be a same physical entity or different physical entities. When being the same physical entity, the receiver and the transmitter may be collectively referred to as a transceiver.

In some embodiments, if the apparatus 10 is the chip or the circuit, the input port 13 is an input interface, and the output port 14 is an output interface.

In an implementation, a transceiver circuit or a dedicated chip for sending and receiving may be considered to implement functions of the input port 13 and the output port 14. A dedicated processing chip, a processing circuit, a processor, or a general chip may be considered to implement the processor 11.

In another implementation, a general computer may be considered to implement the terminal device provided in this embodiment of this disclosure. To be specific, program code for implementing functions of the processor 11, the input port 13, and the output port 14 is stored in the memory 12, and a general purpose processor executes the code in the memory 12 to implement the functions of the processor 11, the input port 13, and the output port 14.

The functions and actions of the modules or the units of the communications apparatus 10 that are enumerated above are only examples for description. The modules or the units of the communications apparatus 10 may be configured to perform the actions or the processing processes performed by the terminal device in the foregoing method 200. Herein, to avoid repetition, a detailed description thereof is omitted.

For a concept, an explanation, a detailed description, and other steps of the apparatus 10 that are related to the technical solution provided in this embodiment of this disclosure, refer to the description about the content in the foregoing method or another embodiment, and details are not described herein again.

Figure 8:
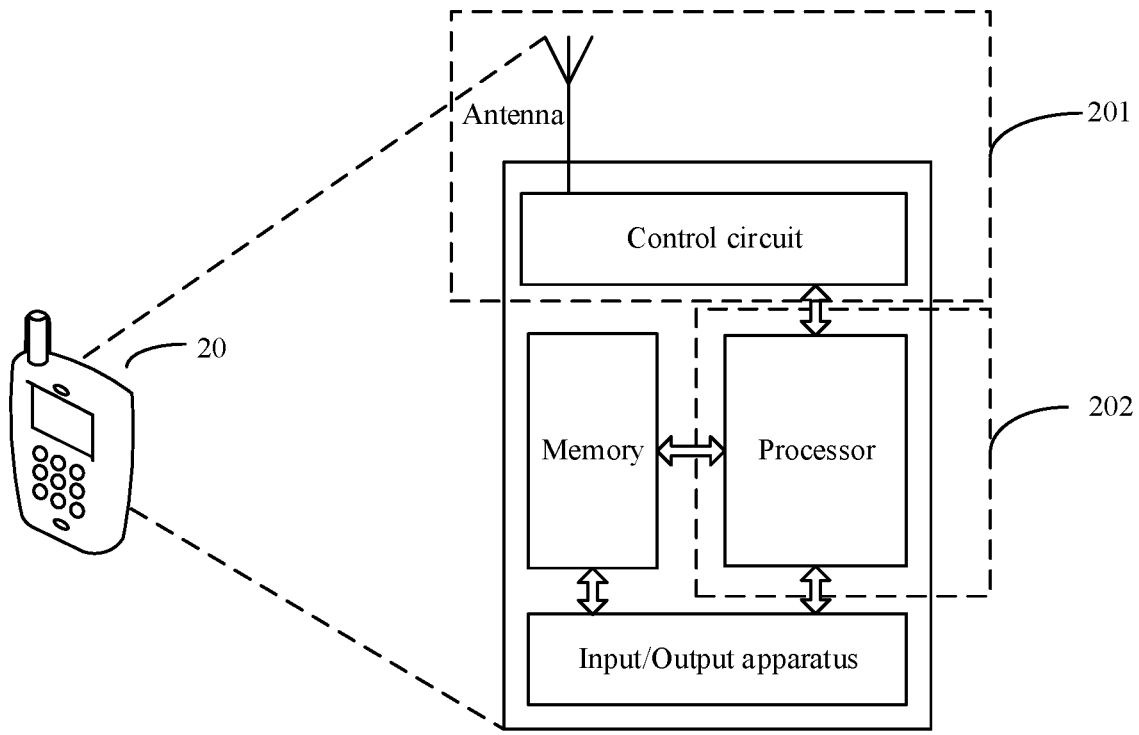
FIG. 8 is a schematic block diagram of an example of a terminal device according to an embodiment of this disclosure.

FIG. 8 is a schematic structural diagram of a terminal device 20 according to this disclosure. The terminal device 20 may be applied to the system shown in FIG. 1. For ease of description, only main components of the terminal device are shown in FIG. 8. As shown in FIG. 8, the terminal device 20 includes a processor, a memory, a control circuit, an antenna, and an input/output apparatus.

The processor is mainly configured to: process a communication protocol and communication data, control the entire terminal device, execute a software program, and process data of the software program, for example, configured to support the terminal device in performing the actions described in the foregoing precoding matrix transmission indication method embodiment. The memory is mainly configured to store the software program and data, for example, store the codebook described in the foregoing embodiment. The control circuit is mainly configured to convert a baseband signal and a radio frequency signal, and process the radio frequency signal. The control circuit together with the antenna may also be referred to as a transceiver, mainly configured to receive and send a radio frequency signal of an electromagnetic wave form. The input/output apparatus, such as a touchscreen, a display screen, or a keyboard, is mainly configured to receive data entered by a user and output data to the user.

After the terminal device is turned on, the processor may read the software program stored in the storage unit, explain and execute an instruction of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in a form of electromagnetic wave by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and one processor. In an actual terminal device, a plurality of processors and a plurality of memories may exist. The memory may also be referred to as a storage medium, a storage device, or the like. This is not limited in this embodiment of this disclosure.

In an example implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 8 integrates functions of the baseband processor and the central processing unit. A person skilled in the art may understand that the baseband processor and the central processing unit may alternatively be processors independent of each other, and are interconnected by using technologies such as a bus. A person skilled in the art may understand that, the terminal device may include a plurality of baseband processors to adapt to different network standards, the terminal device may include a plurality of central processing units to enhance a processing capability of the terminal device, and parts of the terminal device may be connected via various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a software program form. The processor executes the software program, to implement a baseband processing function.

For example, in this embodiment, the antenna having a transceiver function and the control circuit may be considered as a transceiver unit 201 of the terminal device 20, and the processor having a processing function may be considered as a processing unit 202 of the terminal device 20. As shown in FIG. 8, the terminal device 20 includes the transceiver unit 201 and the processing unit 202. The transceiver unit may also be referred to as a transceiver, a transceiver, a transceiver apparatus, or the like. In some embodiments, a component for implementing a receiving function in the transceiver unit 201 may be considered as a receiving unit, and a component for implementing a sending function in the transceiver unit 201 may be considered as a sending unit, in other words, the transceiver unit 201 includes a receiving unit and a sending unit. For example, the receiving unit may also be referred to as a receiver, a receiver, a receiving circuit, or the like, and the sending unit may be referred to as a transmitter, a transmitter, a transmitter circuit, or the like.

Figure 9:
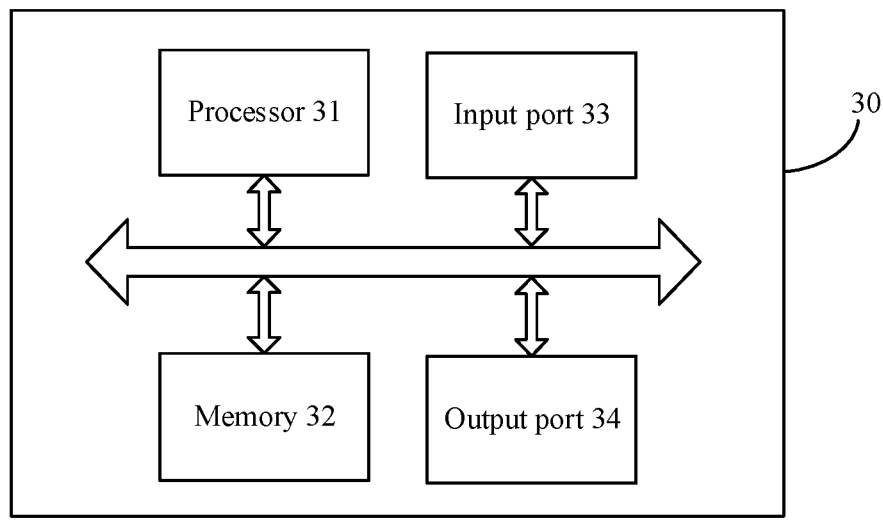
FIG. 9 is a schematic block diagram of another example of a communications apparatus according to this disclosure.

Based on the foregoing method, FIG. 9 is a second schematic diagram of a communications apparatus 30 according to an embodiment of this disclosure. As shown in FIG. 9, the apparatus 30 may be a network device (for example, the foregoing network device #A), or may be a chip or a circuit, for example, a chip or a circuit that may be disposed in the network device. The network device corresponds to the network device (for example, the network device #A) in the foregoing method.

The apparatus 30 may include a processor 31 (namely, an example of a processing unit) and a memory 32. The memory 32 is configured to store an instruction. The processor 31 is configured to execute the instruction stored in the memory 32, to enable the apparatus 30 to implement the steps performed by the network device (for example, the network device #A) in the method corresponding to FIG. 2.

Further, the apparatus 30 may include an input port 33 (namely, an example of a communications unit) and an output port 33 (namely, another example of a processing unit). Still further, the processor 31, the memory 32, the input port 33, and the output port 34 may communicate with each other through an internal connection path, to transfer a control and/or data signal. The memory 32 is configured to store a computer program. The processor 31 may be configured to invoke the computer program from the memory 32 and run the computer program, to control the input port 33 to receive a signal, and control the output port 34 to send a signal, thereby completing the steps of the network device in the foregoing method 200. The memory 32 may be integrated into the processor 31, or may be disposed separate from the processor 31.

In some embodiments, if the apparatus 30 is the network device, the input port 33 is a receiver, and the output port 34 is a transmitter. The receiver and the transmitter may be a same physical entity or different physical entities. When being the same physical entity, the receiver and the transmitter may be collectively referred to as a transceiver.

In some embodiments, if the apparatus 30 is the chip or the circuit, the input port 33 is an input interface, and the output port 34 is an output interface.

Figure 2:
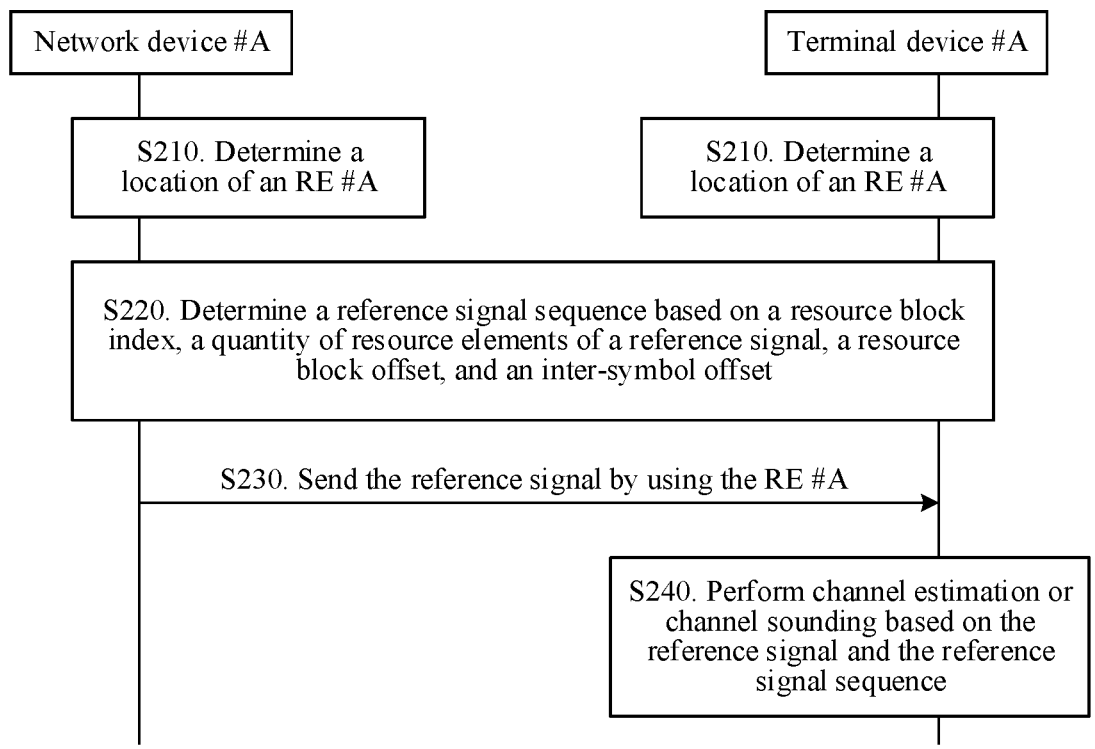
FIG. 2 is a schematic interaction diagram of an example of a communication method according to this disclosure.

In some embodiments, if the apparatus 30 is the chip or the circuit, the apparatus 30 may not include the memory 32, and the processor 31 may read an instruction (a program or code) in a memory outside the chip to implement the function of the network device in the foregoing method corresponding to FIG. 2.

In an implementation, a transceiver circuit or a dedicated chip for sending and receiving may be considered to implement functions of the input port 33 and the output port 34. A dedicated processing chip, a processing circuit, a processor, or a general chip may be considered to implement the processor 31.

In another implementation, a general computer may be considered to implement the network device provided in this embodiment of this disclosure. To be specific, program code for implementing functions of the processor 31, the input port 33, and the output port 34 is stored in the memory, and a general purpose processor executes the code in the memory to implement the functions of the processor 31, the input port 33, and the output port 34.

The modules or the units of the communications apparatus 30 may be configured to perform the actions or the processing processes performed by the network device in the foregoing method 200. Herein, to avoid repetition, a detailed description thereof is omitted.

For a concept, an explanation, a detailed description, and other steps of the apparatus 30 that are related to the technical solution provided in this embodiment of this disclosure, refer to the description about the content in the foregoing method or another embodiment, and details are not described herein again.

Figure 10:
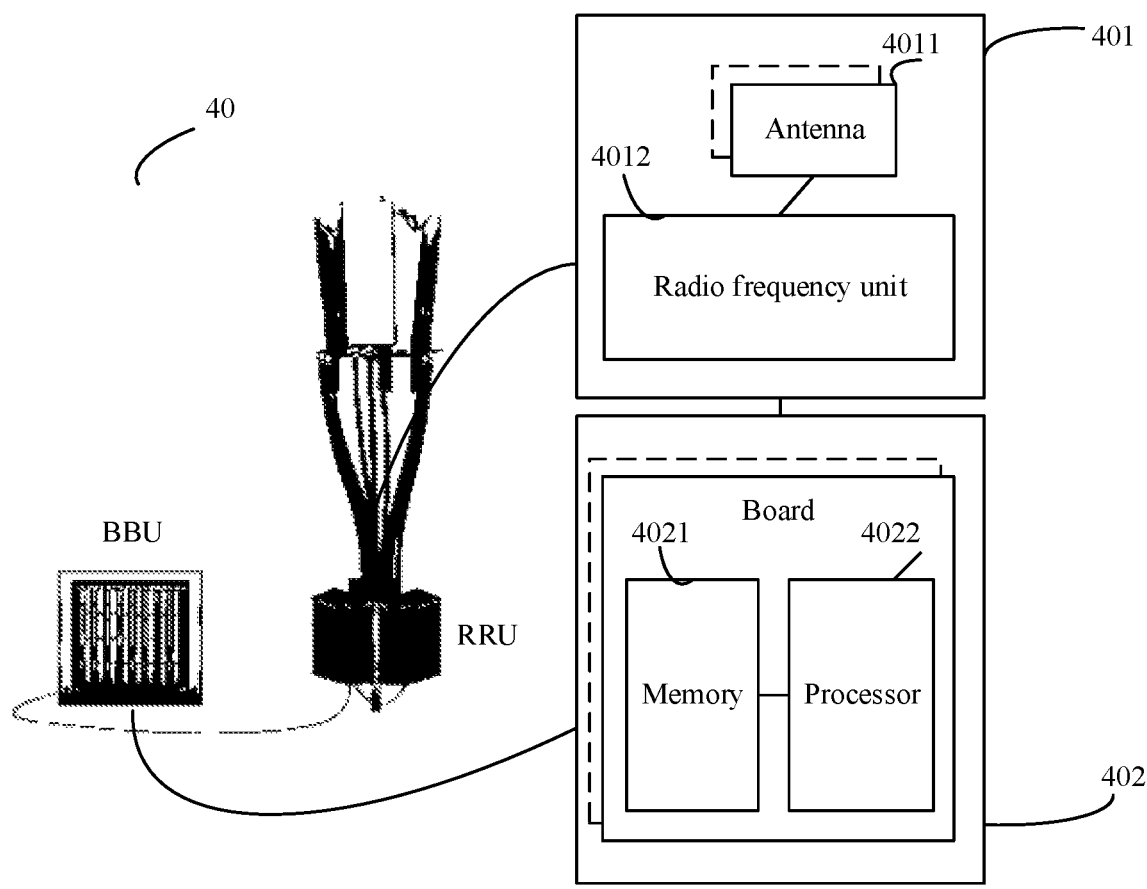
FIG. 10 is a schematic block diagram of another example of a network device according to an embodiment of this disclosure.

FIG. 10 is a schematic structural diagram of a network device according to an embodiment of this disclosure. The network device may be configured to implement the function of the network device in the foregoing method. For example, FIG. 10 may be a schematic structural diagram of a base station. As shown in FIG. 10, the base station may be applied to the system shown in FIG. 1. The base station 40 includes one or more radio frequency units, such as a remote radio unit (RRU) 401, and one or more baseband units (BBU) (which may also be referred to as a digital unit, DU) 402. The RRU 401 may be referred to as a transceiver unit, a transceiver, a transceiver circuit, a transceiver, or the like, and may include at least one antenna 4011 and a radio frequency unit 4012. The part, namely, the RRU 401, is mainly configured to send and receive a radio frequency signal and perform conversion between the radio frequency signal and a baseband signal, for example, configured to send the signaling message in the foregoing embodiment to a terminal device. The part, namely, the BBU 402, is mainly configured to perform baseband processing, control the base station, and the like. The RRU 401 and the BBU 402 may be physically disposed together, or may be physically separately disposed, in other words, the base station 40 is a distributed base station.

The BBU 402 is a control center of the base station, also referred to as a processing unit, and mainly configured to complete a baseband processing function, for example, channel coding, multiplexing, modulation, and spectrum spreading. For example, the BBU (the processing unit) 402 may be configured to control the base station 40 to perform the operation procedure of the network device in the foregoing method embodiment.

In an example, the BBU 402 may include one or more boards, and a plurality of boards may jointly support a radio access network (such as an LTE systems or a 5G system) in a single access standard, or may separately support radio access networks in different access standards. The BBU 402 further includes a memory 4021 and a processor 4022. The memory 4021 is configured to store a necessary instruction and necessary data. For example, the memory 4021 stores a codebook or the like in the foregoing embodiment. The processor 4022 is configured to control the base station to perform a necessary action, for example, configured to control the base station to perform the operation procedure of the network device in the foregoing method embodiment. The memory 4021 and the processor 4022 may serve one or more boards. In other words, a memory and a processor may be disposed on each board. Alternatively, a plurality of boards may share a same memory and a same processor. In addition, a necessary circuit may be further disposed on each board.

In a possible implementation, with development of a system-on-a-chip (SoC) technology, all or some of the functions of the 402 part and the 401 part may be implemented by using the SoC technology, for example, may be implemented by a base station function chip. Components such as a processor, a memory, and an antenna interface are integrated into the base station function chip, a program of a base station—related function is stored in the memory, and the processor executes the program to implement the base station—related function. In some embodiments, the base station function chip can further read a memory outside the chip to implement the base station—related function.

It should be understood that the example of the structure of the base station in FIG. 10 is only a possible form, and should not constitute any limitation on this embodiment of this disclosure. This disclosure does not exclude a possibility of occurrence of a base station structure in another form in future.

Based on the method provided in the embodiments of this disclosure, an embodiment of this disclosure further provides a communications system. The communications system includes the network device and one or more terminal devices.

It should be understood that, the processor in the embodiments of this disclosure may be a central processing unit (CPU), or may be another general purpose processor, a digital signal processor (DSP), an disclosure-specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It should be further understood that the memory herein may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedure or functions according to the embodiments of this disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean a chronological order of execution in various embodiments of this disclosure. The chronological order of execution of the processes should be determined based on functions and internal logic of the processes, and should not be construed as any limitation on the implementation processes of the embodiments of this disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular disclosures and design constraints of the technical solutions. A person skilled in the art may use different methods to implement the described functions for each particular disclosure, but it should not be considered that the implementation goes beyond the scope of this disclosure. It may be clearly understood by a person skilled in the art that, for the purpose of convenient and brief description, for a detailed working process of the foregoing system, apparatus, and unit, refer to a corresponding process in the foregoing method embodiment, and details are not described herein again. In the several embodiments provided in this disclosure, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this disclosure may be integrated into one processing unit, or each of the units may exist alone physically, or two or more units may be integrated into one unit. When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing description is merely specific implementations of this disclosure, but is not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for receiving a reference signal, comprising:
   determining, by a terminal device, a location of a resource element to which a reference signal is mapped;
   determining, by the terminal device, a reference signal sequence corresponding to the resource element, wherein an index of each element in the reference signal sequence is determined based on a resource block index of a resource block corresponding to the resource element, a quantity of resource elements that carry a reference signal in the resource block, a resource block offset, or an inter-symbol offset; and
   receiving, by the terminal device, the reference signal by using the resource element, and performing channel estimation or channel sounding based on the received reference signal and the reference signal sequence.

2. The method according to claim 1, wherein determining, by the terminal device, the reference signal sequence corresponding to the resource element comprises:
   determining, by the terminal device, that an index m of a reference signal sequence r(m) corresponding to a location (k, l) of the resource element is: $m = K \cdot (n_{PRB} + n_{offset}) + K \cdot l \cdot \Delta + m'$, $m' = 0, \ldots, K-1$, wherein
   k is a subcarrier index corresponding to the resource element, l is a time domain symbol index corresponding to the resource element, m is an index of an element in the reference signal sequence, $n_{PRB}$ is the resource block index, K represents the quantity of resource elements that carry the reference signal in the resource block, $n_{offset}$ is the resource block offset, and $\Delta$ is the inter-symbol offset.

3. The method according to claim 2, wherein the subcarrier index of the resource element and the resource block index are defined relative to a bandwidth part BWP; and
   the time domain symbol index corresponding to the resource element is defined relative to a start symbol of a slot.

4. The method according to claim 1, wherein a value of the inter-symbol offset is determined based on a subcarrier spacing corresponding to the resource block.

5. The method according to claim 1, wherein the value of the inter-symbol offset is greater than or equal to a bandwidth of a bandwidth part (BWP).

6. The method according to claim 1, wherein the value of the inter-symbol offset is greater than or equal to N*M, wherein N is a ratio of a maximum subcarrier spacing used for a carrier to a minimum subcarrier spacing used for the carrier, and M is greater than or equal to a bandwidth of a bandwidth part (BWP).

7. The method according to claim 1, wherein the value of the inter-symbol offset is greater than or equal to L*M, wherein L is a maximum quantity of bandwidth parts (BWPs) that can be configured for the carrier, and M is greater than or equal to a bandwidth of a BWP.

8. The method according to claim 1, wherein the resource block offset is an offset between a minimum resource block (RB) index of a bandwidth part (BWP) and a minimum carrier RB index, or
   the resource block offset is notified by using higher layer signaling.

9. The method according to claim 1, wherein the resource block offset is a value that is of a frequency domain location of a bandwidth part (BWP) and that is configured by using higher layer signaling.

10. The method according to claim 1, wherein a bandwidth part (BWP) is an initial BWP, and a value of the resource block offset is 0.

11. A communications apparatus, comprising:
    a processor, configured to execute a computer program stored in a memory, to enable the communications apparatus to perform:
    determining a location of a resource element to which a reference signal is mapped;
    determining a reference signal sequence corresponding to the resource element, wherein an index of each element in the reference signal sequence is determined based on a resource block index of a resource block corresponding to the resource element, a quantity of resource elements that carry a reference signal in the resource block, a resource block offset, or an inter-symbol offset; and
    receiving the reference signal by using the resource element, and performing channel estimation or channel sounding based on the received reference signal and the reference signal sequence.

12. The communication apparatus according to claim 11, wherein determining the reference signal sequence corresponding to the resource element comprises:
    determining that an index m of a reference signal sequence r(m) corresponding to a location (k, l) of the resource element is: $m = K \cdot (n_{PRB} + n_{offset}) + K \cdot l \cdot \Delta + m'$, $m' = 0, \ldots, K-1$, wherein
    k is a subcarrier index corresponding to the resource element, l is a time domain symbol index corresponding to the resource element, m is an index of an element in the reference signal sequence, $n_{PRB}$ is the resource block index, K represents the quantity of resource elements that carry the reference signal in the resource block, $n_{offset}$ is the resource block offset, and $\Delta$ is the inter-symbol offset.

13. The communication apparatus according to claim 12, wherein the subcarrier index of the resource element and the resource block index are defined relative to a bandwidth part BWP; and
    the time domain symbol index corresponding to the resource element is defined relative to a start symbol of a slot.

14. The communication apparatus according to claim 11, wherein a value of the inter-symbol offset is determined based on a subcarrier spacing corresponding to the resource block.

15. The communication apparatus according to claim 11, wherein the value of the inter-symbol offset is greater than or equal to a bandwidth of a bandwidth part (BWP).

16. The communication apparatus according to claim 11, wherein the value of the inter-symbol offset is greater than or equal to N*M, wherein N is a ratio of a maximum subcarrier spacing used for a carrier to a minimum subcarrier spacing used for the carrier, and M is greater than or equal to a bandwidth of a bandwidth part (BWP).

17. The communication apparatus according to claim 1, wherein the value of the inter-symbol offset is greater than or equal to L*M, wherein L is a maximum quantity of BWPs that can be configured for the carrier, and M is greater than or equal to a bandwidth of a bandwidth part (BWP).

18. The communication apparatus according to claim 11, wherein the resource block offset is an offset between a minimum resource block (RB) index of a bandwidth part (BWP) and a minimum carrier RB index, or
the resource block offset is notified by using higher layer signaling.

19. The communication apparatus according to claim 11, wherein the resource block offset is a value that is of a frequency domain location of a bandwidth part (BWP) and that is configured by using higher layer signaling.

20. The communication apparatus according to claim 11, wherein a bandwidth part (BWP) is an initial BWP, and a value of the resource block offset is 0.

* * * * *

UNITED STATES PATENT AND TRADEMARK OFFICE
CERTIFICATE OF CORRECTION

| | | |
|---|---|---|
| PATENT NO. | : 11,323,221 B2 | Page 1 of 1 |
| APPLICATION NO. | : 16/876087 | |
| DATED | : May 3, 2022 | |
| INVENTOR(S) | : Zheng Chen | |

It is certified that error appears in the above-identified patent and that said Letters Patent is hereby corrected as shown below:

In the Specification

Column 18, Lines 19-20 should be replaced with the following paragraph:
The inter-symbol offset is *ti* 2 lV. A*f* , where N 4, and lV2 275 or N 276.

Signed and Sealed this
Twenty-sixth Day of July, 2022

*Katherine Kelly Vidal*

Katherine Kelly Vidal
*Director of the United States Patent and Trademark Office*